United States Patent
Patrone et al.

(10) Patent No.: US 6,787,489 B2
(45) Date of Patent: Sep. 7, 2004

(54) ABSORBENT MIXTURE AND PRODUCT

(75) Inventors: Louis Patrone, Hamburg, NY (US); Paul A. Riemenschneider, Williamsville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 55 days.

(21) Appl. No.: 10/020,830

(22) Filed: Dec. 12, 2001

(65) Prior Publication Data

US 2003/0157855 A1 Aug. 21, 2003

(51) Int. Cl.⁷ .................. B32B 27/12; B32B 27/04; B32B 9/04

(52) U.S. Cl. .............. 442/118; 428/323; 428/326; 428/327; 428/484; 428/485; 428/497

(58) Field of Search .................. 428/323, 326, 428/327, 484, 485, 497; 442/59, 118

(56) References Cited

U.S. PATENT DOCUMENTS

| | | |
|---|---|---|
| 1,059,061 A | 4/1913 | Miller |
| 1,856,890 A | 5/1932 | Stokes |
| 1,867,067 A | 7/1932 | Fischer |
| 2,094,691 A | 10/1937 | Williams |
| 2,164,764 A | 7/1939 | Claypoole |
| 2,915,110 A | 12/1959 | Ferguson et al. |
| 4,728,111 A | 3/1988 | Yoshijima et al. |
| 5,390,939 A | 2/1995 | Terauchi et al. |
| 5,736,473 A * | 4/1998 | Cohen et al. ............. 442/239 |
| 5,767,176 A * | 6/1998 | Nakanishi et al. ........ 523/404 |
| RE36,206 E | 5/1999 | Borneby |

* cited by examiner

Primary Examiner—Ula Ruddock
(74) Attorney, Agent, or Firm—Joseph P. Gastel

(57) ABSTRACT

An absorbent mixture consisting of an absorbent such as sodium or potassium polyacrylate, a fluent wax and a channeling agent. A product consisting of a porous member containing a mixture including an absorbent such as sodium or potassium polyacrylate, a fluent wax and a channeling agent.

12 Claims, No Drawings

ABSORBENT MIXTURE AND PRODUCT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an improved absorbent mixture and product which will expand to fill a void when exposed to liquid water.

By way of background, various types of absorbent mixtures and products are known. However, insofar as known, such absorbent mixtures and products have not in the past contained superabsorbents in a wax base.

BRIEF SUMMARY OF THE INVENTION

It is one object of the present invention to provide a mixture containing a superabsorbent which will not expand when exposed to water vapor, but will only expand when subjected to liquid water.

It is another object of the present invention to provide an absorbent product, such as an elongated string containing a superabsorbent which can be produced on a continuous basis and which is flexible so that it can be wound to be stored and which will not absorb moisture from the air but will absorb liquid aqueous solutions when it is subjected thereto.

A further object of the present invention is to provide an improved absorbent mixture which can readily be used to impregnate flexible porous bases, such as strings or sheets and which will not absorb moisture from the air but will only absorb liquid water and which will expand to fill a void. Other objects and attendant advantages of the present invention will readily be perceived hereafter.

The present invention relates to an absorbent mixture comprising a superabsorbent, a wax and a channeling agent.

The present invention also relates to a superabsorbent product comprising a porous member, a superabsorbent, a wax and a channeling agent.

The various aspects of the present invention will be more readily understood when the following portions of the specification are read in conjunction with the accompanying drawings wherein:

DETAILED DESCRIPTION OF THE INVENTION

Summarizing briefly in advance, the improved absorbent mixture of the present invention includes a superabsorbent which expands to multiple times its original volume when exposed to liquid water but will not be activated to produce such expansion when exposed only to water vapor, such as is found in humid air. This is due to the fact that the superabsorbent is encapsulated in wax which prevents water vapor from contacting the superabsorbent. However, the wax contains a channeling agent which conducts liquid water to the superabsorbent when the wax is exposed to the liquid water. As noted hereafter, the absorbent mixture can be used by itself to fill a void, or it can be a flexible string-like product which incorporates the wax mixture, or it can be in the form of a washer or gasket which incorporates the wax mixture, or it can take any type of configuration which incorporates the mixture and is used to fill a void.

The absorbent mixture of the present invention includes a superabsorbent, a wax which encapsulates the superabsorbent and thus protects it from absorbing water vapor, and a channeling agent which when subjected to liquid water will create channels in the wax base to permit the liquid water to reach the superabsorbent and be absorbed thereby.

The absorbent composition can be used in numerous different forms. In this respect, it can be used by itself as a paste, if the wax is not a rigid solid, and can be applied to a surface or can be placed in a container, or can be inserted into a groove in a device. It can also take the form of a product wherein the composition is impregnated into an elongated porous string which is flexible and the string with the mixture therein can be wound about an item so as to expand to fill a void when it is exposed to an aqueous solution. It can also take the form of a member, such as a washer, which is fabricated from a porous sheet which has been impregnated with the mixture.

The preferred superabsorbent of the composition can either be sodium polyacrylate or potassium polyacrylate. The polyacrylates may be present by weight in the composition in the amount of between about 5% and 90%, and more preferably between about 15% and 60%, and most preferably between about 21% and 25%. Also, other highly absorbent compounds, such as cellulose, starches, alginates and gums may form a part of the mixture instead of the above superabsorbents. The highly absorbent powders may be used in the same proportions as the superabsorbents.

The preferred wax which is used is a petroleum-based wax. A petroleum based wax known under the trademark EVACOTE 7295 was used. However, any other suitable type of wax may be used which will encapsulate the superabsorbent and protect it from absorbing aqueous vapor. The other waxes which may be used include animal waxes, vegetable waxes, and synthetic type waxes. The wax should be present by weight in the amount of between about 10% and 85%, and more preferably between about 50% and 75%, and most preferably between about 60% and 65%.

The mixture includes microcrystalline cellulose which is a channeling agent. A microcrystalline cellulose known under the trademark AVICEL PH101 of the FMC Corp. was used. Actually when the mixture is subjected to liquid water or an aqueous solution, the microcrystalline cellulose acts as a wick to create channels in the wax, thereby conducting liquid water to the superabsorbent which then absorbs the aqueous solution in a well known manner, namely, by absorbing numerous times its weight of the aqueous solution and causes the superabsorbent to expand numerous times of its original volume to thereby fill a void.

In other words, when the microcrystalline cellulose is subjected to liquid water, it provides micro channels which makes the wax more permeable. Other channeling agents which may be used include but are not limited to gums, alginates and starches.

The channeling agent may be present by weight in an amount of between about 2% and 40%, and more preferably between about 8% and 25%, and most preferably between about 12% and 14%.

The mixture is formed in the following manner. Correct amounts of the channeling agent and the superabsorbent are mixed until a homogeneous blend is obtained, usually within five minutes. The correct amount of wax is melted into a liquid and the blend of channeling agent and superabsorbent are mixed into a uniform mixture.

The foregoing wax mixture may be used by itself by applying it to a surface or into a container or into a groove between parts. In addition, the wax mixture may be applied to a porous string member by impregnating the latter by passing it through a molten tank of the wax mixture. In this respect, it can be done by passing an indeterminate length of porous string around rollers in a tank of the molten mixture, permitting the mixture to congeal, and thereafter winding the string onto a spool. A string which has been used is a porous string manufactured by TNS Mills which is primarily a cotton material having a product weight of 2500 yards per pound. It will be appreciated that any suitable type of porous string or tape can be used.

In addition to the foregoing, a porous sheet can be impregnated with the above-described mixture when it is in a molten state, permitting the mixture to congeal while remaining a paste, and thereafter cutting forms from the sheet to form flexible washers or other forms which can be placed on or between parts to expand to fill a void. It will also be appreciated that a wax which does not remain in paste form but is a rigid solid can also be used considering that embodiments such as washers need not be flexible for storage, such as in the case with a string-type product.

A preferred mixture has been made having the following composition by weight:

| | |
|---|---|
| Sodium polyacrylate | 23% |
| Petroleum-based wax (EVACOTE 7295) | 64% |
| Microcrystalline cellulose | 13% |

In the above description sodium and potassium polyacrylates have been given as examples of superabsorbents. However, it will be appreciated that a superabsorbent within the contemplation of the present invention is any compound which will expand greatly when exposed to water in both a vapor and liquid state.

It will be appreciated that the improved mixture, whether it is used in paste form, string form, washer form or any other form, will expand when subjected to liquid water to fill the volume in which it is located. However, when the mixture or product is merely exposed to water vapor, it will remain inactive until it is actually exposed to water in liquid form.

While preferred embodiments of the present invention have been disclosed, it will be understood that it is not limited thereto but may be otherwise embodied within the scope of the following claims.

What is claimed is:

1. A liquid water absorbing mixture comprising a wax containing a superabsorbent and a channeling agent, wherein said superabsorbent is present by weight in the amount of between about 5% and 90%, wherein said wax is present by weight in the amount of between about 10% and 85%, and wherein said channeling agent is present by weight in an amount of between about 2% and 40%.

2. A liquid water absorbing mixture as set forth in claim 1 wherein said wax is selected from the group consisting of petroleum based, animal, vegetable and synthetic waxes.

3. A liquid water absorbing mixture as set forth in claim 1 wherein said channeling agent is selected from the group consisting of microcrystalline cellulose, gums, alginates and starches.

4. A liquid water absorbing mixture as set forth in claim 1 wherein said channeling agent is microcrystalline cellulose.

5. A liquid water absorbing mixture as set forth in claim 1 wherein said superabsorbent is selected from the group consisting of sodium and potassium polyacrylates.

6. A product comprising a porous member containing a liquid water absorbing mixture of a wax containing a superabsorbent and a channeling agent, wherein said superabsorbent is present by weight in the amount of between about 5% and 90%, wherein said wax is present by weight in the amount of between about 10% and 85%, and wherein said channeling agent is present by weight in an amount of between about 2% and 40%.

7. A product as set forth in claim 6 wherein said wax is selected from the group consisting of petroleum-based, animal, vegetable and synthetic waxes.

8. A product as set forth in claim 6 wherein said channeling agent is selected from the group consisting of microcrystalline cellulose, gums, alginates and starches.

9. A product as set forth in claim 6 wherein said channeling agent is microcrystalline cellulose.

10. A product as set forth in claim 6 wherein said superabsorbent is selected from the group consisting of sodium and potassium polyacrylates.

11. A product as set forth in claim 6 wherein said porous member is a string.

12. A product as set forth in claim 6 wherein said porous member is a form which has been fabricated from a sheet.

* * * * *